April 20, 1943.   G. S. McKEE ET AL   2,316,963
COCCIDICIDE
Filed May 15, 1939
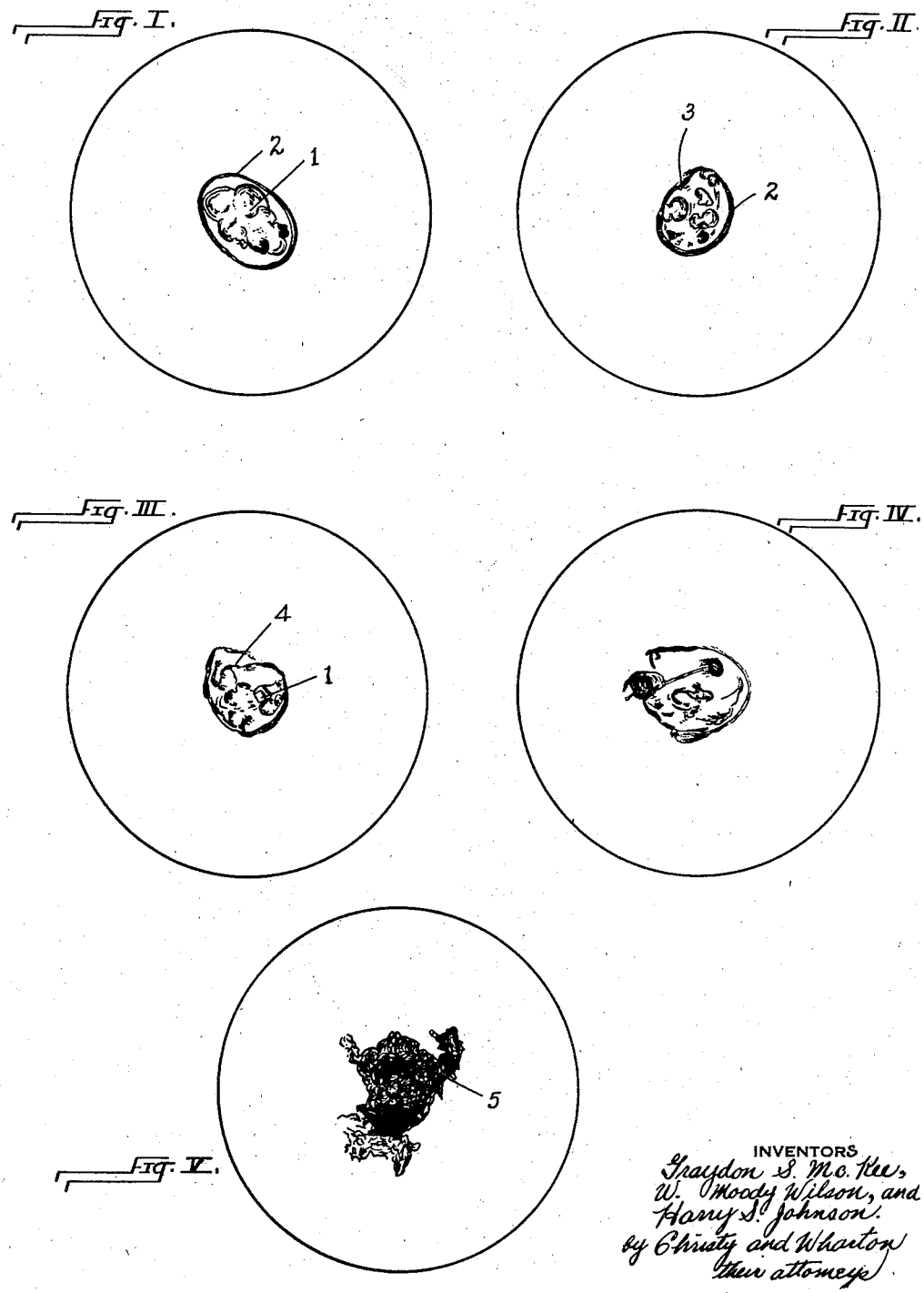

Patented Apr. 20, 1943

2,316,963

UNITED STATES PATENT OFFICE 2,316,963

COCCIDICIDE

Graydon S. McKee, Washington, Wilbert Moody Wilson, Beaver, and Harry S. Johnson, Pittsburgh, Pa.

Application May 15, 1939, Serial No. 273,720

6 Claims. (Cl. 167—14)

This invention relates to the destruction of the protozoan coccidium.

The coccidium is an earth-borne protozoan, which when present in the intestinal tract of fowls or mammals seriously injures, or kills, the host. Because of the nature of the coccidia it is practically impossible to free an infected animal of them, since they are able to resist the attack of all those known agents which the animal is able to endure. It is, therefore, important to protect fowls and other animals against coccidia by eliminating the coccidia from areas which animals, and particularly young chickens, frequent.

Coccidia are very persistent in infected areas as in poultry houses, poultry runs, barns, barnyards, paddocks, and the like, their presence having been detected for more than two years in disused areas from which potential hosts were absent. This fact alone makes it difficult to eliminate the coccidia, but a difficulty of greater importance in disinfecting areas infected by coccidia is the same fact which makes it a practical impossibility to free an animal of them once they have gained entrance into the animal as a host. This fact is that the coccidium has a unicellular body including a soft inner portion encapsulated by a thin but resistant tegument, or capsule, and because of this capsule, coccidia have ability to endure the disinfectants commonly used to eliminate ground-borne pests. Thus, they are resistant against phenols and oxidants, and they also have ability to resist acids and alkalis in relatively high concentration.

We have primarily invented, or discovered, that sodium nitrite is a specific coccidicide in such order that by use of a preparation containing it, the coccidium may be rapidly eliminated from infected areas. This discovery arose during research and experiment conducted for the purpose of discovering an efficient coccidicide from our underlying discovery that artificially produced sodium nitrate is an effective agent for that purpose. Our first discovery was that artificially produced sodium nitrate is an effective coccidicide, and later found that naturally-occurring sodium nitrate has of itself no coccidicidal effect. This we determined to be for the reason that it has associated with it no sodium nitrite, whereas artificially produced sodium nitrate contains from 0.5% to 2.00% of sodium nitrite, and has an average content of about 1.62% of sodium nitrite.

Sodium nitrite being thus the active agent in destroying the coccidium, we have had success in using the artificially prepared sodium nitrate for that purpose, and in experimenting with sodium nitrite by itself, have found that the sodium nitrite acts much more rapidly in destroying coccidia if it be associated with sodium nitrate.

We, therefore, employ sodium nitrite, preferably in association with sodium nitrate, in freeing infected areas from the presence of coccidia. Our method of disinfection is to apply sodium nitrite preferably in association with sodium nitrate on the floor, walls, and equipment of a building, such as a chicken house, infected with coccidia, or on the ground of chicken runs, barnyards, and the like. The material is applied either as a relatively strong solution, or in finely divided form. In the latter variant of our method moisture from previous or subsequent sprinkling, or moisture naturally deposited from the atmosphere, or given off by animals within a building, is depended upon to form a solution rendering the sodium nitrite effective. If young chicks are to be introduced into a chicken house which is known, or suspected, to be infected with coccidia, our coccidicidal preparation (if used in solution) is desirably applied 12 to 24 hours before the chicks are brought in. If the preparation is applied as a finely divided solid, a somewhat longer period for complete destruction of the coccidia may desirably be allowed.

The accompanying drawing, following closely as possible actual microphotographs, illustrate progressive stages in the destructive action of sodium nitrite upon a coccidium. In this drawing, Fig. I shows a coccidium in a high order of magnification, before the organism is subjected to sodium nitrite. Fig. II illustrates the condition of the coccidium immediately after contact of sodium nitrite with it. Fig. III shows the next later stage in the progressive action of the sodium nitrite. Fig. IV shows a stage in which the organism has been killed, and is in a noticeable state of disintegration. Fig. V shows the final stage of disintegration to which the organism is brought by the action of the sodium nitrite.

More in detail to describe the mechanism of destruction illustrated in the drawing, in Fig. I the coccidium will be seen to consist of a relatively soft unicellular body 1 enclosed by a resistant tegument or capsule 2. Fig. II of the drawing shows the capsule 2 penetrated at 3 by the sodium nitrite. In Fig. III there has been a marked breaking of the capsule at 4 and a marked destructive effect probably lethal has been caused to the inner body of the organism.

While we do not wish to commit ourselves to a theory of the action by which sodium nitrite destroys coccidia, it is reasonable to interpret the actual progress of destruction as microscopically observed, and as shown in the drawing, as consisting, first of a penetration of sodium nitrite through the capsule 2 of the coccidium; and that the sodium nitrite, when it has so penetrated, by reducing internal pressure in the organism, causes disintegration of the interior body structure of the organism, and breakage of the capsule by atmospheric pressure. This would seem to be indicated particularly by Fig. IV of the drawing in which disintegration of the interior body structure of the coccidium has proceeded to a readily noticeable extent, and in Fig. V of the drawing in which the disintegrated body 5 is shown. The theory is also consistent with the apparent effect of sodium nitrate in association with the actively destructive sodium nitrite.

It has been above observed that sodium nitrite of itself serves eventually to eliminate coccidia but that that action is slow, unless it be associated with sodium nitrate. We have observed that sodium nitrite of itself tends molecularly to agglomerate, to form a relatively non-penetrating solution with water, particularly when present in high concentration. If, however, sodium nitrate be included with the sodium nitrite in a water solution, a proportionally less agglomerated, and more penetrative, solution is formed for any concentration of sodium nitrite. Apparently the sodium nitrate acts as a vehicle for the sodium nitrite, facilitating the migration of the sodium nitrite through the capsule of the coccidium. It is, therefore, desirable that the sodium nitrate be, for use under most conditions, associated with the sodium nitrite which is the active lethal agent.

We have found that there is no critical limitation as to the proportions in which sodium nitrate and sodium nitrite are included in our coccidicidal preparation. Thus, we have obtained good results by using, as above noted, artificially prepared sodium nitrate which may contain as a relatively incidental constituent as small a quantity as .5% of sodium nitrite. We have also satisfactorily used our coccidicidal preparation mixed to consist of as much as 90% sodium nitrite to 10% sodium nitrate, and, as noted, we have eliminated coccidia from infected areas by using as a coccidicidal preparation sodium nitrite alone. We may state that for general use we prefer to include in our preparation sodium nitrite and sodium nitrate in a preponderating proportion of the latter.

It may be generally stated that if the coccidicidal preparation is to be used by sprinkling it in a dry, finely divided, state, under conditions in which there will be but slight moisture available for dissolving the sodium nitrite, it is desirable in such case to include the sodium nitrate in greater proportion than if the preparation is to be used in solution, or in the presence of an abundant supply of moisture, such as is had in rain-soaked ground, or immediately after washing out a chicken house, or other building. It is also desirable that if sodium nitrite greatly preponderates in the preparation, that a solution of the preparation should not exceed a concentration of about 30%, in order to avoid retarding the penetrating property of the sodium nitrite and unduly retarding its migration through the capsules of the coccidia.

While the above gives general directions as to desirability in preferred detailed procedure of the method of using the coccidicidal preparation, it is also illustrative of the fact that sodium nitrite may be used alone as the sole constituent of the preparation, and that it may be associated in any proportion with the lethally inert, but practically useful, sodium nitrate. In further illustration, we may give the following results of experiments conducted by us as illustrative of the action of our coccidicidal preparation. In these experiments there was prepared a saturated suspension of coccidia in distilled water. Various solutions of a coccidicidal preparation in accordance with our invention were brought into contact with the organisms on the slide of a microscope and the results were microscopically observed as follows:

| Saturated suspension of coccidia. | Treated with sodium nitrate. | No action at all. |
|---|---|---|
| Do | 1 drop and 1 drop 1% sodium nitrite. | Killed but capsule not ruptured. Action slow. |
| Do | 1 drop and 1 drop 10% sodium nitrite. | Internal structure changed and capsule ruptured. |
| Do | 1 drop and 1 drop 30% sodium nitrite. | Rapid change of the internal structure, capsule broken. |
| Do | 1 drop and 1 drop 50% sodium nitrite. | Internal structure changed, capsule broken. Action slower. |
| Do | 1 drop sat. solution of sodium nitrite 83% added to one drop sat. coccidia. | Cell structure changed and shell finally broken. Action much slower. |
| Do | 1 drop and 1 drop 1% sodium nitrite and 1 drop of sat. sol. sod. nitrate. | Capsule swollen and finally ruptured. |
| Do | Same as immediately above except 10% sod. nitrate used instead of 1%. | Action very rapid, capsule expands and breaks. |

These test experiments, in addition to illustrating the fact that sodium nitrite is a lethal agent for coccidia, show that the action of the sodium nitrite is retarded if solutions of the sodium nitrite above a certain concentration be made without including sodium nitrate. The test experiments also show that it is not a necessary feature of the coccidicidal action that the capsules of the coccidia be actually ruptured; but that the organism may be killed by a dilation of its encircling capsule unaccompanied by an actual rupture of the capsule, such as the rupture shown in the accompanying drawing. It appears to be a fact, however, that actual rupture of the capsules is indicative of a rapid destruction of the coccidia. It appears that the dilation of the capsules of the coccidia which results in death to the organisms is caused by, or accompanied by, a lowering of pressure in the organism. It does not appear, however, whether such lowering of pressure is a general effect of the nitrite, or is caused by absorption of oxygen from, or through the capsules of the organisms.

Under actual field conditions, we have found that the inclusion of the sodium nitrate with the sodium nitrite is of greater advantage than appears under laboratory conditions. This is for the reason that in use the preparation may be employed in variable concentrations and under conditions in which rapid action is particularly desirable. Since the sodium nitrate is of itself inert, it is desirable that the preparation be packed and sealed in moisture-proof containers prior to its use, in order that gradual conversion of sodium nitrite into sodium nitrate may not take place. It is also desirable to associate with the chemicals of our preparation a moisture-absorbing substance which will be preferentially wet by water, such as rice flour, or a similar absorbent substance.

In the laboratory the results obtained by using sodium nitrite closely parallel the results obtained by the use of iodine. Whereas iodine is, however, an impractical substance for use under the conditions existing in actual disinfection against coccidia, sodium nitrite is from every consideration wholly practical under those conditions.

This is in part a continuation of our pending application Serial No. 138,472, filed April 22, 1937, which it is purposed to replace.

We claim as our invention:

1. A coccidicidal preparation containing sodium nitrite.

2. A coccidicidal preparation containing sodium nitrite and sodium nitrate.

3. A coccidicidal preparation containing sodium nitrite and sodium nitrate with the sodium nitrate preponderating in the preparation.

4. A coccidicidal preparation having sodium nitrite as its chief lethal ingredient.

5. The herein described method of disinfecting an area purposed for animal occupation against infestation by the protozoan coccidium which consists in destroying the coccidia adjacent the surface of such area by the lethal action of sodium nitrite introduced on the surface thereof.

6. The herein described method of disinfecting an area purposed for animal occupation against infestation by the protozoan coccidium which consists in destroying the coccidia adjacent the surface of such area by the lethal action of sodium nitrite introduced on the surface thereof in association with sodium nitrate.

GRAYDON S. McKEE.
W. MOODY WILSON.
HARRY S. JOHNSON.